United States Patent
Briat et al.

(10) Patent No.: US 11,650,738 B2
(45) Date of Patent: May 16, 2023

(54) INTEGRITY CHECK OF A MEMORY

(71) Applicant: STMicroelectronics (Grenoble 2) SAS, Grenoble (FR)

(72) Inventors: Gerald Briat, Vif (FR); Stephane Marmey, Fontanil (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 17/111,778

(22) Filed: Dec. 4, 2020

(65) Prior Publication Data

US 2021/0173568 A1 Jun. 10, 2021

(30) Foreign Application Priority Data

Dec. 5, 2019 (FR) ........................................ 1913806

(51) Int. Cl.
*G06F 3/06* (2006.01)

(52) U.S. Cl.
CPC .......... *G06F 3/0619* (2013.01); *G06F 3/0652* (2013.01); *G06F 3/0659* (2013.01); *G06F 3/0679* (2013.01)

(58) Field of Classification Search
CPC .... G06F 3/0619; G06F 3/0652; G06F 3/0659; G06F 3/0679; G06F 21/79
See application file for complete search history.

(56) References Cited

U.S. PATENT DOCUMENTS

| | | | |
|---|---|---|---|
| 6,536,671 B1* | 3/2003 | Baentsch | G06F 1/30 235/487 |
| 6,834,331 B1* | 12/2004 | Liu | G06F 11/1417 711/103 |
| 8,850,103 B2* | 9/2014 | Bennett | G11C 16/32 711/151 |
| 2007/0028035 A1* | 2/2007 | Nishihara | G06F 12/0246 711/103 |
| 2007/0192528 A1* | 8/2007 | Fukuda | G11C 16/0491 711/100 |
| 2011/0060875 A1* | 3/2011 | Haukness | G11C 16/10 711/103 |
| 2012/0079603 A1 | 3/2012 | Brown et al. | |
| 2019/0369916 A1* | 12/2019 | Khon | G06F 3/0604 |

FOREIGN PATENT DOCUMENTS

WO 02073622 A1 9/2002

OTHER PUBLICATIONS

M28W640HCT, Nov. 2008, Numonyx, pp. 59-66. (Year: 2008).*
INPI Search Report and Written Opinion for FR 1913806 dated Oct. 7, 2020 (8 pages).

* cited by examiner

*Primary Examiner* — Kalpit Parikh
(74) *Attorney, Agent, or Firm* — Crowe & Dunlevy

(57) ABSTRACT

The integrity of a memory is checked by: storing data representative of an operation to be executed in the memory; executing the operation; and erasing the data once the execution is complete.

23 Claims, 5 Drawing Sheets

INTEGRITY CHECK OF A MEMORY

PRIORITY CLAIM

This application claims the priority benefit of French Patent application number 1913806, filed on Dec. 5, 2019, the content of which is hereby incorporated by reference in its entirety to the maximum extent allowable by law.

TECHNICAL FIELD

The present disclosure relates generally to electronic circuits and, more specifically, to memories.

BACKGROUND

A memory is generally used to store data, for example instructions and constants, making it possible to execute a program via a processor. Operations to change the content of the memory are then performed each time one of these data is updated.

When a reset of the memory occurs during such operations, this generally interrupts the modification of the content of the memory and the data that are stored therein may then be altered. The integrity of the memory is then said to be compromised.

There is a need to check the integrity of a memory.

There is a need to address all or some of the drawbacks of known methods for checking memory integrity

SUMMARY

One embodiment provides a method for checking the integrity of a memory, comprising the following steps: storing data representative of an operation to be executed in the memory; executing the operation; and erasing the data once the execution is complete.

According to one embodiment, the method further comprises a step of reading the data: before executing another operation in the memory; and/or after resetting the memory.

According to one embodiment, the method further comprises a step of detecting, as a function of the data, whether an interruption has occurred during the execution of the operation.

According to one embodiment, the method further comprises a step of repeating the operation if an interruption is detected.

According to one embodiment, the method further comprises a step, before the repetition of the operation, of completely erasing a memory page subsequently configured to be modified by the operation.

According to one embodiment, the data include an operation code that is a function of a nature of operation to be performed in the memory.

According to one embodiment, the operation code is assigned a value chosen from a plurality of sets of values comprising: a first set of values, if no operation is being executed in the memory; a second set of values, if a write operation is being executed in the memory; a third set of values, if an erase operation is being executed in the memory; and a fourth set of values, in case of configuration operation of the microcontroller, the first and fourth sets of values each preferably being made up of a single value.

According to one embodiment, the second set of values comprises: a first value, if a write operation of a word is being executed in the memory; and a second value, if a write operation of several words, preferably eight words, is being executed in the memory.

According to one embodiment, the third set of values comprises: a third value, if an erase operation of a memory page is being executed in the memory; a fourth value, if an erase operation of a memory bank is being executed in the memory; and a fifth value, if an erase operation of several memory banks, preferably two memory banks, is being executed in the memory.

According to one embodiment, the data further include: an address pointing to a memory area where the operation is executed; an identifier of a memory bank where the operation is executed; and an identifier of a memory chip where the operation is executed.

According to one embodiment, the memory is part of a microcontroller including: a processor; and at least two memory chips, preferably exactly two memory chips, each memory chip comprising at least two memory banks, preferably exactly two memory banks.

According to one embodiment, the data are stored in a register of one of the memory chips.

According to one embodiment, as long as the execution of an operation is not complete, a non-programmed system is configured to impose, on connecting pads of the memory, control signals corresponding to that operation.

According to one embodiment, the memory is a flash memory.

One embodiment provides a finite state machine configured to implement the described method.

One embodiment provides a system comprising at least one memory configured to implement the described method.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the nature and the content of the data that may be written, read and erased in the memory are not described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
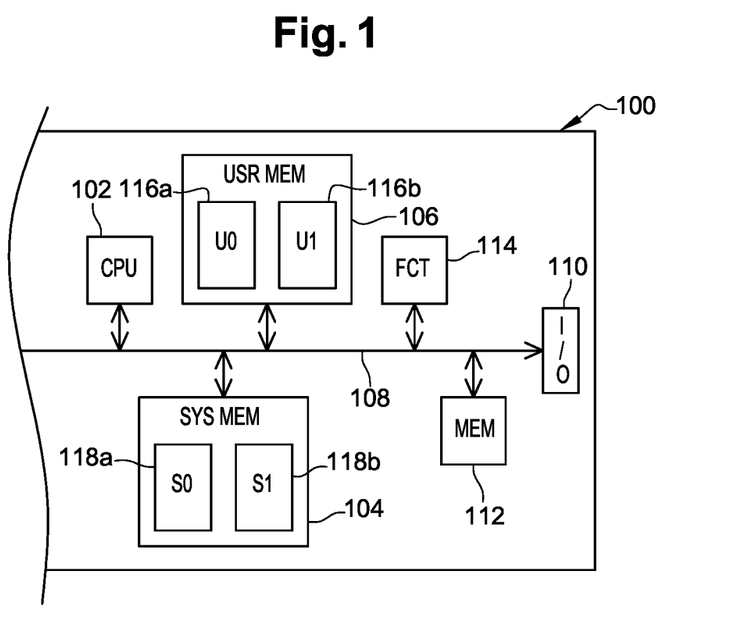
FIG. 1 shows, schematically and in block form, an exemplary microcontroller of the type to which, as an example, the described embodiments apply.

FIG. 1 shows, schematically and in block form, an exemplary microcontroller 100 of the type to which, as an example, the described embodiments apply.

In FIG. 1, the microcontroller 100 includes a processing unit 102 (CPU). The processing unit 102 is, for example, a processor configured to execute code instructions of a computer program.

The microcontroller 100 further includes a flash memory chip 104 (SYS MEM), also called system memory 104 in the remainder of the disclosure. In general, the system memory 104 is primarily used to store data related to the intrinsic operation of the microcontroller 100. These data typically allow the microcontroller 100 to operate independently of the selected application. As an example, the system memory 104 in particular contains data associated with a "watchdog" making it possible to control the execution duration, by the processor 102, of the code instructions of the computer program.

The microcontroller 100 includes another flash memory chip 106 (USR MEM), also called user memory 106 in the remainder of the disclosure. In general, the user memory 106 is primarily used to store data specific to the selected application. As an example, the memory 106 contains the code instructions of the computer program executed by the processor 102 as well as constants related to this execution.

The system memory 104 has a content that is generally factory-set, for example by the manufacturer of the microcontroller 100. The user memory 106 conversely has a content that is often configured later, specifically to suit each application in which the microcontroller 100 is used.

The flash memory chip 106 may include a plurality of memory blocks 116, or memory banks 116. In the example illustrated in FIG. 1, the user memory 106 of the microcontroller 100 includes two memory blocks 116a (U0) and 116b (U1). Similarly, the flash memory chip 104 may include a plurality of memory blocks 118, or memory banks 118. In the example illustrated in FIG. 1, the system memory 104 of the microcontroller 100 includes two memory blocks 118a (S0) and 118b (S1).

In practice, each memory block 116, 118 physically corresponds to a separate sub-entity or hardware region inside the flash memory chip 106, 104 to which it belongs.

In the example of FIG. 1, the microcontroller 100 also includes: one or several data, addresses and/or control buses 108 between the different elements inside the microcontroller 100; an input/output interface 110 (I/O) for communication with the outside of the microcontroller 100; and one or several other volatile and/or non-volatile storage memories, symbolized in FIG. 1 by a block 112 (MEM), for example a random-access memory (RAM), making it possible to store dynamic variables related to the execution of the program by the processor 102.

As a function of the targeted application, the microcontroller 100 may also include various other functional circuits. In FIG. 1, these circuits are symbolized by a single block 114 (FCT).

As an example, the processing unit 102, the system memory 104, the user memory 106, the input/output interface 110, the other memories 112 and the other circuits 114 are made on a single substrate and form an architecture of the "system-on-chip" (SoC) type.

Figure 2:
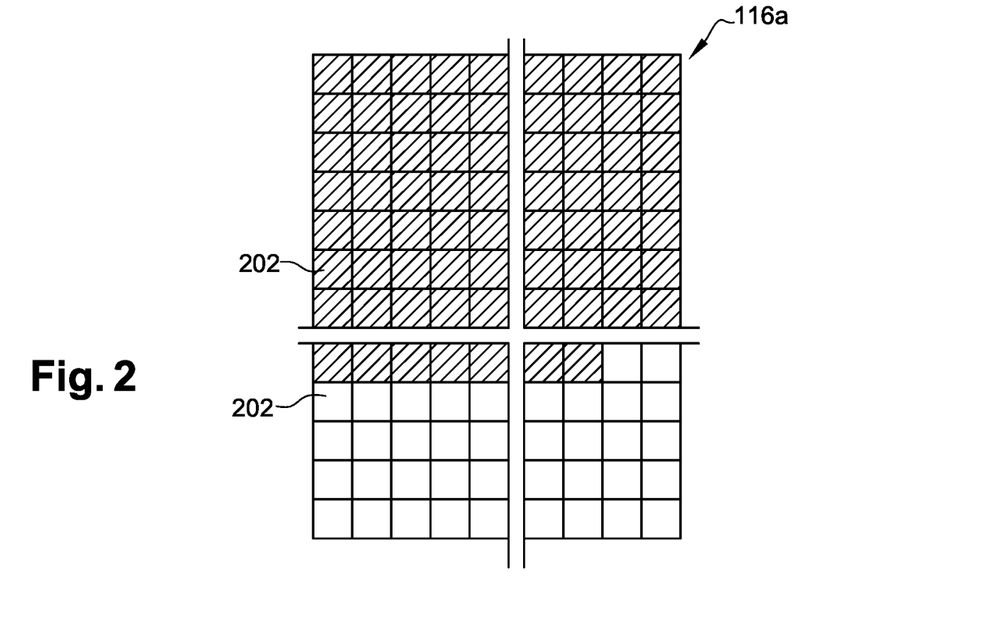
FIG. 2 shows, schematically, an exemplary memory block of the type to which, as an example, the described embodiments apply.

FIG. 2 shows, schematically, an exemplary memory block 116a of the type to which, as an example, the described embodiments apply.

The memory block 116a of the flash memory chip 106 includes, as illustrated in FIG. 2, a matrix of memory points 202. These memory points 202, or memory cells 202, are organized in rows and columns of the matrix of memory cells 202. For the sake of clarity, only several memory cells 202 have been shown in FIG. 2 provided that, in practice, the memory block 116a may include any number of memory cells 202, for example several thousand or several million memory cells 202.

Each memory cell 202 of the memory block 116a stores a bit whose value corresponds to a logic state among two possible logic states, for example denoted "0" and "1". Inside the memory block 116a, several memory cells 202 may be grouped together. In particular, several memory cells 202, for example 137 adjacent memory cells 202, may be grouped together in order to form a word with 137 bits. Each word with 137 bits is, for example, made up of 128 data bits and 9 bits forming an error correction code (ECC).

Inside the memory block 116a of the user memory 106, the rows of the matrix of memory cells 202 for example each include 8 words. Furthermore, still inside the memory block 116a, several rows may be grouped together. In particular, several rows of the memory block 116a, for example 512 consecutive rows, may be grouped together in order to form a memory page of the memory block 116a.

The memory block 116a of the flash memory chip 106 of the microcontroller 100, for example, has a total capacity of 1 MB (one megabyte). The memory block 116b of the flash memory chip 106 of the microcontroller 100 preferably has a structure similar to that of the memory block 116a.

In other words, the memory chip 106 is divided into two memory banks 116a and 116b. Each memory bank 116a, 116b is subdivided into several memory pages. Each memory page is in turn subdivided into 512 lines, each comprising 8 words of 137 bits each.

The flash memory chip 104 preferably has a structure similar to that of the flash memory chip 106 as disclosed above.

In FIG. 2, a crosshatched box arbitrarily symbolizes a memory cell 202 used to store an information item, for example a program fragment executed by the processor 102 of the microcontroller 100, and a non-crosshatched box symbolizes a memory cell 202 not used to store an information item.

The memory cells 202 that are used to store an information item each contain a bit whose value is equal to one or the other of the binary states 0 and 1, this value being able to vary from one memory cell 202 to the other. The bits of the memory cells 202 that are not used to store an information item are generally all equal to a same value, for example 1.

As shown in FIG. 2, the information items are, for example, stored inside the memory block 116a in adjacent memory cells 202. In the orientation of FIG. 2, the memory cells 202 located in the upper part of the memory block 116a are used to store pieces of information, while the memory cells 202 located in the lower part of the memory block 116a do not store information. In other words, the memory block 116a includes, in its lower part, a free area not allocated to information storage.

Figure 3:
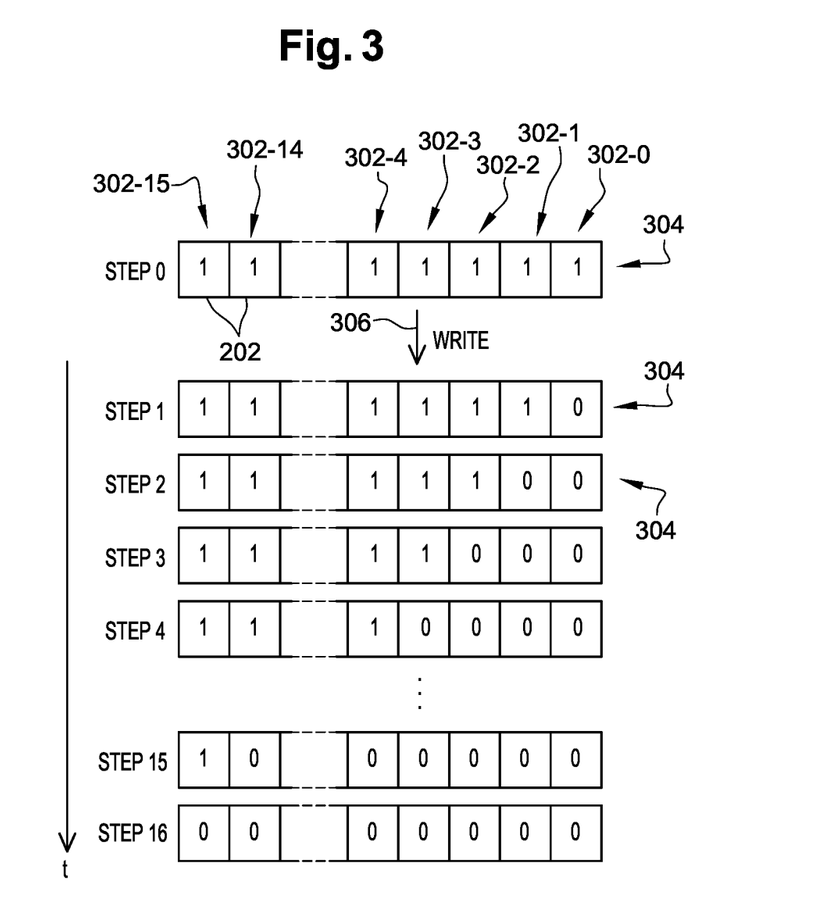
FIG. 3 schematically illustrates an exemplary content change operation of a memory.

FIG. 3 schematically illustrates an exemplary content change operation of a memory.

It is assumed that one wishes to modify data bytes 302 of a same word 304 stored, for example, in the memory block 116a of the memory chip 106. It is further assumed that the word 304 includes 16 bytes of data 302 (302-0, 302-1, 302-2, 302-3, 302-4, . . . , 302-14 and 302-15), the bits of each byte 302, in an initial step (STEP 0), all being equal to 1. This, for example, corresponds to a situation in which the word 304 has not yet been modified, or a situation in which the word 304 has previously undergone at least one erase operation.

In FIG. 3, a square containing a "1" shows a data byte 302 for which all of the bits are equal to 1, and a square containing a "0" shows a data byte 302 for which all of the bits are equal to 0.

It is considered that: the bytes 302 located on the side of the byte 302-0 (on the right, in the orientation of FIG. 3) constitute least significant bytes of the word 304; and the bytes 302 located on the side of the byte 302-15 (on the left, in the orientation of FIG. 3) constitute most significant bytes of the word 304.

For simplification purposes, it is assumed that one wishes to perform a write operation comprising arbitrarily setting all of the data bytes 302 of the word 304 to 0. A command corresponding to this write operation is symbolized, in FIG. 3, by an arrow 306 (WRITE). This write command 306 is, for example, sent to the memory chip 106 by the processor 102.

In the example illustrated in FIG. 3, it is assumed that the write operation is performed by successive steps by changing, preferably byte by byte, from the least significant bytes to the most significant bytes, the value of each byte 302 of the word 304. The expression "set to 0" with respect to a byte means setting to 0 all of the bits of that byte.

The write operation comprises, as illustrated in FIG. 3: a first step (STEP 1) comprising setting the byte 302-0 of the word 304 to 0; a second step (STEP 2), after the first step, of setting the byte 302-1 to 0; a third step (STEP 3), after the second step, of setting the byte 302-2 to 0; a fourth step (STEP 4), after the third step, of setting the byte 302-3 to 0; steps (not shown), of setting the byte 302-4 to 0, then successively setting all of the bytes 302 of the word 304 comprised between the byte 302-4 and the byte 302-14 to 0; a fifteenth step (STEP 15), after the fourteenth step and the steps not shown, of setting the byte 302-14 to 0; and a sixteenth step (STEP 16), after the fifteenth step, of setting the byte 302-15 to 0.

An interruption, for example caused by a reset of the memory chip 106 and/or of the processor 102 (FIG. 1), may occur during the write operation. It is assumed, as an example, that an interruption occurs between the second step STEP 2 and the third step STEP 3 of the write operation described in relation with FIG. 3. It is further assumed that the value of the word 304 is, at the time of the interruption, equal to that which it had at the end of the second step STEP 2. In other words, it is assumed that, at the time of the interruption, the bytes 302-0 and 302-1 of the word 304 are equal to 0 and all of the bits of the other bytes 302 of the word 304 are equal to 1. The word 304 thus retains, after the interruption, the value that it had at the end of the second step STEP 2 (bytes 302-0 and 302-1 equal to 0, and all of the bits of the other bytes 302 equal to 1).

In general, if an interruption occurs during a step n (where n is a natural integer such that 1≤n≤16) of the write operation of the word 304, then the content of the word 304 is equal, after the interruption, to the content of the word 304 at the end of the step n−1. In this case, the content of the word 304 does not comply with the expected value at the end of the write operation (all of the bytes 302 of the word 304 equal to 0), the interruption having introduced an involuntary change of the value of the word 304 to be written. The word 304 is then said to be altered or corrupted. This means, more generally, that the integrity of the data of the memory chip 106 is compromised, in other words, that the integrity of the memory 106 is compromised.

One may think to provide, for each word, for the use of an error correction code (ECC) making it possible, for example, to detect two errors and to correct one of them. However, during a write or erase operation, the memory chip 106 is subject to an electric voltage during a duration sufficient to place all of the bits concerned by the operation in the desired state. If a reset occurs during the application of this electric voltage, the operation is interrupted and the bits affected by the operation may then be equal to 1 or 0, or be in an unstable state. In this case, the use of an error correction code does not make it possible to guarantee the integrity of the memory chip 106.

One may further consider implementing, in the memory chip 106, an integrity check of the cyclic redundancy check (CRC) type. However, this would have the drawback of making the operation of the memory chip 106 more complex and substantially reducing the useful capacity of the memory chip 106, in other words, the space allocated to data storage.

Figure 4:
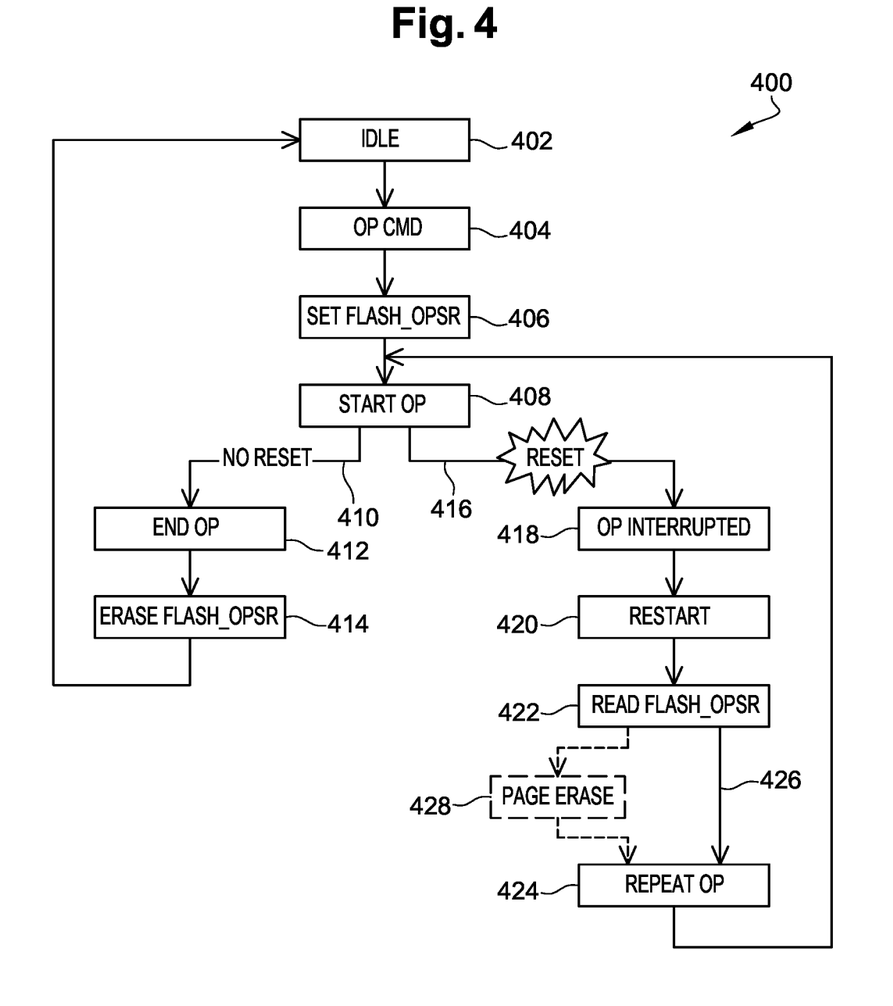
FIG. 4 schematically illustrates a step of one embodiment of an integrity check method of a flash memory.

FIG. 4 schematically illustrates a step of one embodiment of an integrity check method 400 of a flash memory, for example of the flash memory chip 106.

It is arbitrarily considered that the flash memory chip 106 is initially found in a state (block 402, IDLE) corresponding to an idle state. In other words, in the idle state 402, no memory operation, or memory access, is in progress in the flash memory chip 106. Subsequently, the idle state 402 is also called initial state.

It is next assumed that, during another step (block 404, OP CMD), an execution command for a memory operation is transmitted, for example by the processor 102 of the microcontroller 100 (FIG. 1), to the flash memory chip 106. The memory operation command, for example, corresponds to a command of an operation to write data in the memory 106, or a command of an operation to erase data in the memory 106.

During still another step (block 406, SET FLASH_OPSR), data representative of the operation to be executed in the memory 106 are then stored in a register, denoted FLASH_OPSR. The register FLASH_OPSR is preferably a status register belonging to the flash memory chip 104, in other words to the system memory 104. The register FLASH_OPSR is described in detail hereinafter in relation with FIG. 5.

During still another step (block 408, START OP), the execution of the operation is started next in the memory 106.

If no interruption, in particular no reset, occurs (arrow 410, NO RESET) during the execution of the operation in the memory 106, the execution finishes normally during still another step (block 412, END OP). One then erases or resets, during still another step (block 414, ERASE FLASH_OPSR), the content of the status register FLASH_OPSR. One lastly returns to the initial state 402, while waiting for the transmission of another operation command to be executed in the memory 106.

According to one embodiment, although this is not shown in FIG. 4, a step for reading data stored in the status register FLASH_OPSR is provided before the execution of another operation in the memory. This makes it possible to ensure, before each new operation in the memory, that the status register FLASH_OPSR has indeed been erased (step 414) at the end of the execution of the previous operation, in other words, that the previous operation was completed correctly (step 412). Otherwise, it is, for example, possible to provide for prohibiting the execution of any new operation and to generate an error.

If an interruption, for example a reset, occurs (arrow 416, RESET) during the execution of the operation in the memory 106, in other words between the step 408 for beginning of the execution of the operation and the step 412 for end of the execution of the operation, this execution is then interrupted (block 418, OP INTERRUPTED). One then enters another step (block 420, RESTART) for restarting the memory 106 following its reset.

During still another step (block 422, READ FLASH_OPSR), one reads the content of the status register FLASH_OPSR in which the data representative of the operation being executed in the memory 106 at the time of the interruption 418 have remained stored. As a function of the content of the status register FLASH_OPSR, in other words according to the operation to be repeated, it is then possible to transition to still another step (block 424, REPEAT OP) comprising repeating the preceding operation: either directly (arrow 426), in other words with no intermediate step; or by first performing still another optional intermediate step (block 428, PAGE ERASE), for example a step 428 to erase a memory page of the memory 106.

One then returns to step 408 comprising beginning the execution, in the memory 106, of the operation previously interrupted by the reset 416.

As described above, the data stored in the status register FLASH_OPSR, in other words the content of the status register FLASH_OPSR, are preferably read after each interruption of the execution of an operation in the memory 106. The content of the status register FLASH_OPSR is, in particular, read after each reset of the memory 106.

In particular, although this is not shown in FIG. 4, a reset may also occur after the execution of an operation in the memory 106, for example when the memory 106 has returned to the initial state 402 after the step 414 for erasing the status register FLASH_OPSR. A restart of the memory 106 is then done similar to that of step 420, then the content of the status register FLASH_OPSR is read. The status register FLASH_OPSR having previously been erased during step 414, it is deduced that the reset did not interrupt the execution of an operation in the memory. One then returns to the initial state 402, while waiting for a new operation to execute in the memory 106.

In other words, it is possible to detect, as a function of the value of the data contained in the status register FLASH_OPSR, whether an interruption has occurred during the execution of an operation in the memory 106.

According to one preferred embodiment, as long as the execution of an operation is not complete, in other words when one leaves step 408 and as long as one has not reached step 412, a non-programmed system (that is to say, a system not including software such as an embedded hardware circuit for an interface to the memory) is configured to impose, on connecting pads of the memory, command signals corresponding to this operation. In other words, the hardware circuit for the interface to the memory will operate to maintain the command signals (such as, for example, address bus and chip select signals) for implementing the memory operation applied to the connecting pads of the memory notwithstanding the fact that the reset has occurred and the operation has been interrupted.

Figure 5:
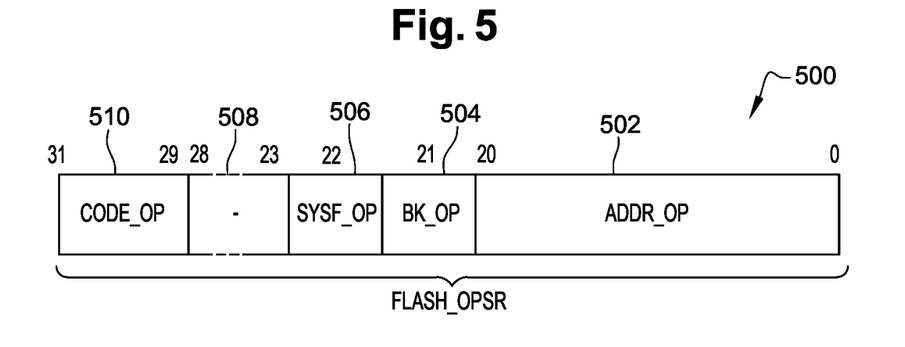
FIG. 5 schematically shows an embodiment of a status register of the type to which, as an example, the described embodiments apply.

FIG. 5 schematically shows an embodiment of a status register 500 (FLASH_OPSR) of the type to which, as an example, the described embodiments apply.

According to one preferred embodiment, the status register FLASH_OPSR contains data including, as illustrated in FIG. 5: an address 502 (ADDR_OP) pointing to an area of the memory where the operation is executed; an identifier 504 (BK_OP) of a memory bank where the operation is executed; an identifier 506 (SYSF_OP) of a memory chip where the operation is executed; a reserved field 508 (–), in other words, a reserved range 508; and an operation code 510 (CODE_OP).

According to one embodiment, the status register FLASH_OPSR is shared by the flash memory chips 104 and 106 of the microcontroller 100 (FIG. 1).

The status register FLASH_OPSR is preferably a 32-bit register, among which: 21 bits (numbered from 0 to 20, in FIG. 5) are allocated to the address 502; one bit (numbered 21, in FIG. 5) is allocated to the memory bank identifier 504; another bit (numbered 22, in FIG. 5) is allocated to the memory chip identifier 506; 6 bits (numbered from 23 to 28, in FIG. 5) are allocated to the reserved range 508; and 3 bits (numbered from 29 to 31, in FIG. 5) are allocated to the operation code 510.

According to one embodiment, the operating code 510 is assigned a value chosen from a plurality of sets of values comprising: a first set of values, if no operation is being executed in the memory; a second set of values, if a write operation is being executed in the memory; a third set of values, if an erase operation is being executed in the memory; and a fourth set of values, in case of configuration operation of the microcontroller 100 (FIG. 1), for example an operation of erasing a memory page, then executing several write controls in the flash memory chip in question.

The operating code 510 preferably corresponds to a hexadecimal value encoded on 3 bits of the status register FLASH_OPSR. The operating code 510 may, if applicable, take 8 values ranging from 0x0 to 0x7. According to one preferred embodiment, the operating code 510 contains a hexadecimal value equal to: 0x0, if no operation is being executed in the memory; 0x1, if a write operation of a word is being executed in the memory; 0x2, if a write operation of several words, preferably eight words, is being executed in the memory; 0x3, if an erase operation of a memory page is being executed in the memory; 0x4, if an erase operation of a memory bank is being executed in the memory; 0x5, if an erase operation of several memory banks, preferably two memory banks, is being executed in the memory; and 0x6, in case of configuration operation of the microcontroller 100.

In this case, the hexadecimal value 0x7 is, for example, a reserved value.

As described above in relation with FIG. 4, the content of the status register FLASH_OPSR is read after each reset of the memory 106. The operating code 510 is, in particular, read after each reset of the memory 106. This, in particular, makes it possible to detect whether an operation was in progress in the memory 106 at the instant where the reset occurred and, if applicable, to determine what type of operation was involved. By basing oneself on the value of the operating code 510, the operation being executed in the memory 106 at the instant of the reset may be repeated with a prior optional erase step.

More specifically, after a reset: if the operating code 510 is equal to 0x0, the content of the memory is not modified; if the operating code 510 is equal to 0x1, the memory page containing the word being written at the instant of the reset is first erased, then this word is written again; if the operating code 510 is equal to 0x2, the memory page containing the eight words being written at the instant of the reset is first erased, then these eight words are written again; if the operating code 510 is equal to 0x3, the memory page that was being erased at the instant of the reset is erased again; if the operating code 510 is equal to 0x4, the memory bank that was being erased at the instant of the reset is erased again; if the operating code 510 is equal to 0x5, the two memory banks that were being erased at the instant of the reset are erased again; and if the operating code 510 is equal to 0x6, the configuration operation of the microcontroller 100 interrupted by the reset is performed again.

Figure 6:
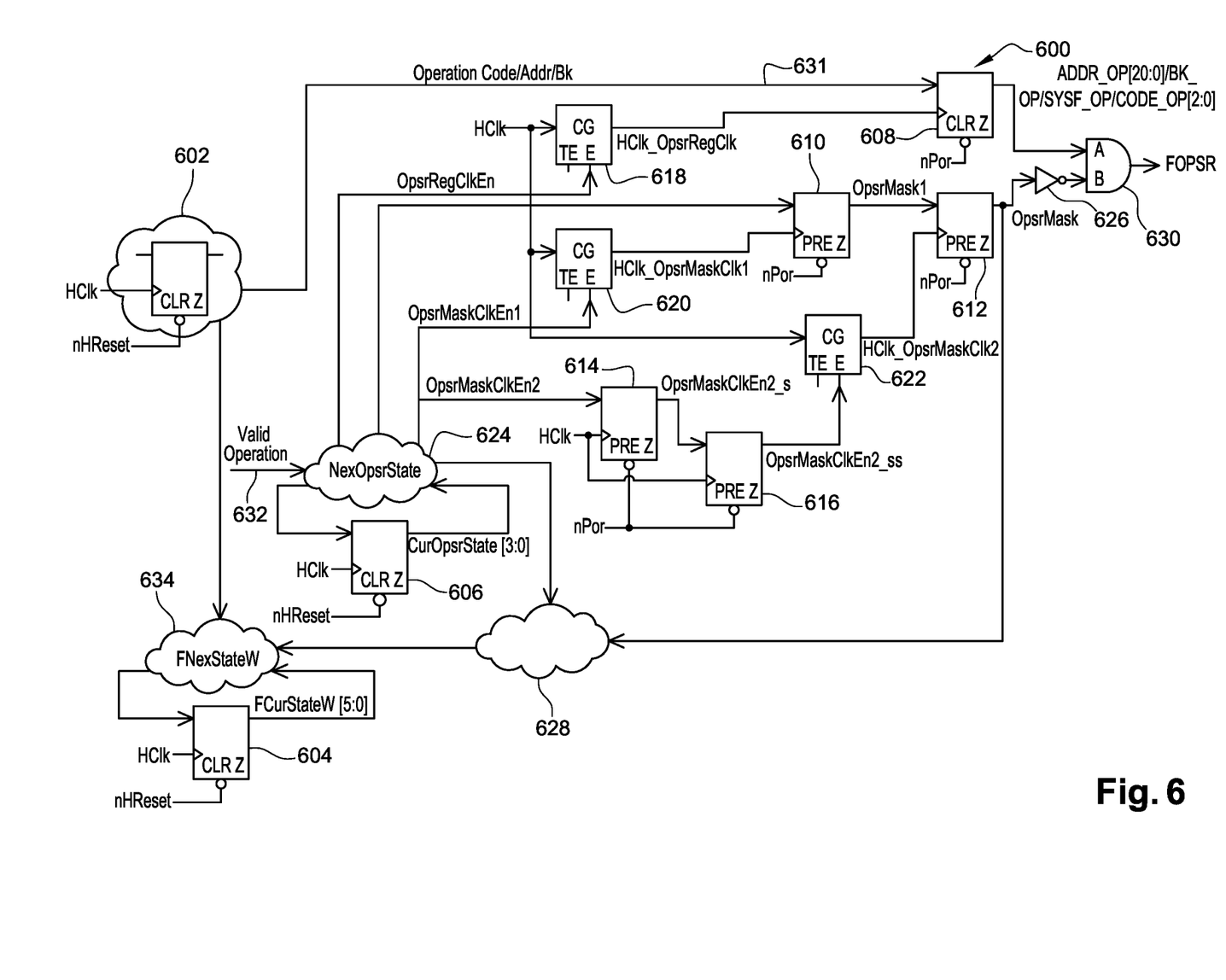
FIG. 6 schematically shows an embodiment of a circuit configured to send an integrity check signal of a flash memory.

FIG. 6 schematically shows an embodiment of a circuit 600 configured to send an integrity check signal of a flash memory.

According to this embodiment, the circuit 600 includes a set of latches 602 and latches 604 and 606. Each latch 602, 604, 606 receives: on a reset input (CLR Z), a reset signal denoted nHReset; and on a synchronization input (>), a synchronization or clock signal denoted HClk.

The circuit 600 further includes other latches 608, 610, 612, 614 and 616. The latch 608 receives, on a reset input (CLR Z), a reset signal denoted nPor. Similarly, each latch 610, 612, 614, 616 receives, on a reset input (PRE Z), the reset signal nPor.

The circuit 600 further includes clock gating (CG) units 618, 620 and 622. The clock gating unit 618 receives, on one input, the clock signal HClk, and on another input (E), a signal denoted OpsrRegClkEn coming from a finite state machine 624 (NexOpsrState). As output, the clock gating unit 618 supplies, at a synchronization input (>) of the latch 608, a signal denoted HClk_OpsrRegClk. The signal HClk_OpsrRegClk corresponds to a pulse of the clock signal HClk.

Similarly, the clock gating unit 620 receives, on one input, the clock signal HClk, and on another input (E), a signal denoted OpsrMaskClkEn1 coming from the finite state machine 624. As output, the clock gating unit 620 supplies, at a synchronization input (>) of the latch 610, a signal denoted HClk_OpsrMaskClk1. The signal HClk_OpsrMaskClk1 corresponds to another pulse of the clock signal HClk.

Each latch 614, 616 receives, on a synchronization input (>), the clock signal HClk. As input, the latch 614 further receives, from the finite state machine 624, a signal denoted OpsrMaskClkEn2. The latch 614 supplies, as output, a signal denoted OpsrMaskClkEn2_s. The latch 616 receives, as input, the signal OpsrMaskClkEn2_s and supplies, as output, a signal denoted OpsrMaskClkEn2_ss.

The clock gating unit 622 receives, on an input (E), the signal OpsrMaskClkEn2_ss and supplies, as output, a signal denoted HClk_OpsrMaskClk2. The signal HClk_OpsrMaskClk2 corresponds to still another pulse of the clock signal HClk.

The latch 610 receives, as input, a signal representative of the current state of the finite state machine 624. The latch 610 is metastable, since it receives data coming from elements that may be reset by the signal nHReset. As output, the latch 610 supplies, to an input of the latch 612, a signal denoted OpsrMask1.

The latch 612 receives, on a synchronization input (>), the signal HClk_OpsrMaskClk2. As output, the latch 612 supplies a signal denoted OpsrMask. The signal OpsrMask is transmitted to the input of an inverting logic gate 626 and an input of an unmasking block 628. The output of the inverting logic gate 626 is connected to an input (B) of an AND logic gate 630. Once the signal OpsrMask is in the high state, the finite state machine 624 is placed in an inactive state, or idle state.

As input, the latch 608 receives, from the set of latches 602, signals corresponding to the operating code 510, the address 502 and the memory bank identifier 504 (FIG. 5). In FIG. 6, these signals are symbolized by an arrow 631 (Operation code/Addr/Bk). As output, the latch 608 supplies, to another input (A) of the AND logic gate 630, signals denoted ADDR_OP[20:0]/BK_OP/SYSF_OP/CODE_OP [2:0] that are representative of the content of the status register 500 (FIG. 5).

The AND logic gate 630 supplies, as output, a signal denoted FOPSR. Although this is not shown in FIG. 6, the signal FOPSR is next transmitted to the processor 102 (FIG. 1) of the microcontroller 100.

As input, the finite state machine 624 receives, from the latch 606, a word denoted CurOpsrState[3:0]. The word CurOpsrState[3:0] corresponds to a current state of the status register 500. The finite state machine 624 further receives a piece of information (arrow 632, Valid Operation) indicating that an execution of a valid operation has been requested.

The signal OpsrMask1, transmitted at the output of the latch 610, is: placed in the high state of the signal nPor is in the low state; placed in the high state if the signal nPor is in the high state, the signal HClk_OpsrMaskClk1 is in the high state and the word CurOpsrState[3:0] is equal to a value denoted OPSR_REMASK1; and placed in the low state if the signal nPor is in the high state, the signal HClk_OpsrMaskClk1 is in the high state and the word CurOpsrState [3:0] is equal to another value denoted OPSR_UNMASK1.

In the circuit 600, another finite state machine 634 (FNexStateW) receives, from the latch 604, a 6-bit word, denoted FCurStateW[5:0]. The finite state machine 634 is, for example, a finite state machine enabling comprehensive management of the operations to be executed in the flash memory chips 104 and 106 of the microprocessor 100. In practice, it is possible to provide one finite state machine 634 for the read operations and another finite state machine 634 for write and erase operations. The word FcurStateW[5:0] contains data representative of a write, erase, or configuration change operation, to be executed in the flash memory chip 104 or 106 of the microprocessor 100.

The circuit 600 is, in particular, configured in order to successively: receive, from the finite state machine 634, the word FCurStateW[5:0] representative of the operation to be executed; copy the word FCurStateW[5:0] in a domain subject to the reset signal nPor; send, in another domain subject to the reset signal nHReset, data indicating that the copy of the word FCurStateW[5:0] has been made correctly; and allow the finite state machine 634 to execute the operation in the flash memory chip 104 or 106.

More generally, the circuit 600 is configured to transmit, or copy, data from the domain subject to the reset signal nHReset toward the other domain subject to the reset signal nPor. The circuit 600 is, in particular, used to ensure that this transmission, or this copy, is done correctly, in other words and avoiding problems with meta-stability and/or incorrect copying in the status register FLASH_OPSR.

Figure 7:
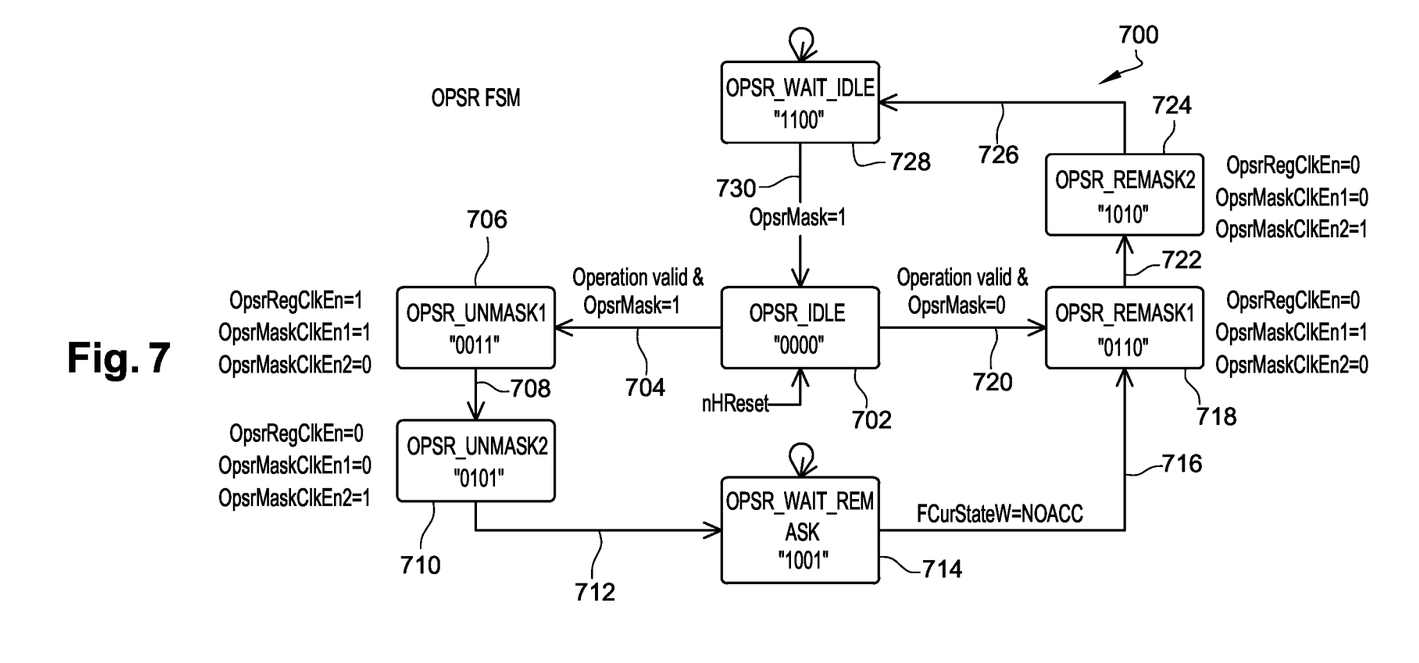
FIG. 7 shows, schematically and in block diagram form, an embodiment of a finite state machine.

FIG. 7 shows, schematically and in block diagram form, an embodiment of a finite state machine 700 (OPSR FSM) in particular configured to generate the signals OpsrRegClkEn, OpsrMaskClkEn1 and OpsrMaskClkEn2 of the circuit 600 of FIG. 6. According to this embodiment, the machine 700 preferably corresponds to the combination of the finite state machine 624 and the latch 606 of the circuit 600 of FIG. 6.

It is assumed that the finite state machine 700 is initially in a state 702 (OPSR_IDLE "0000"). The state 702, for example, corresponds to the state in which the finite state machine 700 is placed following the reception of the reset signal nHReset. In the state 702, all of the bits of the word CurOpsrState[3:0] are equal to 0. In other words, the word CurOpsrState[3:0] is equal to [0000].

From the state 702, the finite state machine 700 may pass (arrow 704, Operation valid & OpsrMask=1) toward another state 706 (OPSR_UNMASK1 "0011"). The finite state machine 700 goes from the state 702 to the state 706 when a valid operation request is made and when the signal OpsrMask is in the high state.

In the state 706: the word CurOpsrState[3:0] is equal to [0011]; the signal OpsrRegClkEn is placed in the high state (OpsrRegClkEn=1); the signal OpsrMaskClkEn1 is placed in the high state (OpsrMaskClkEn1=1); and the signal OpsrMaskClkEn2 is placed in the low state (OpsrMaskClkEn2=0).

From the state 706, the finite state machine 700 may pass (arrow 708) toward still another state 710 (OPSR_UNMASK2 "0101").

In the state 710: the word CurOpsrState[3:0] is equal to [0101]; the signal OpsrRegClkEn is placed in the low state (OpsrRegClkEn=0); the signal OpsrMaskClkEn1 is placed in the low state (OpsrMaskClkEn1=0); and the signal OpsrMaskClkEn2 is placed in the high state (OpsrMaskClkEn2=1).

From the state 710, the finite state machine 700 may pass (arrow 712) toward still another state 714 (OPSR_WAIT_REMASK "1001"). In the state 714, the word CurOpsrState [3:0] is equal to [1001].

From the state 714, the finite state machine 700 may pass (arrow 716, FCurStateW=NOACC) toward still another state 718 (OPSR_REMASK1 "0110").

In the state 718: the word CurOpsrState[3:0] is equal to [0110]; the signal OpsrRegClkEn is placed in the low state (OpsrRegClkEn=0); the signal OpsrMaskClkEn1 is placed in the high state (OpsrMaskClkEn1=1); and the signal OpsrMaskClkEn2 is placed in the low state (OpsrMaskClkEn2=0).

According to one embodiment, the finite state machine 700 may pass directly (arrow 720, Operation valid & OpsrMask=0) from the state 702 toward the state 718. The finite state machine 700 goes from the state 702 to the state 718 when a valid operation request is made and when the signal OpsrMask is in the low state.

From the state 718, the finite state machine 700 may pass (arrow 722) toward still another state 724 (OPSR_REMASK2 "1010").

In the state 724: the word CurOpsrState[3:0] is equal to [1010]; the signal OpsrRegClkEn is placed in the low state (OpsrRegClkEn=0); the signal OpsrMaskClkEn1 is placed in the low state (OpsrMaskClkEn1=0); and the signal OpsrMaskClkEn2 is placed in the high state (OpsrMaskClkEn2=1).

From the state 724, the finite state machine 700 may pass (arrow 726) toward still another state 728 (OPSR_WAIT_IDLE "1100"). In the state 728, the word CurOpsrState[3:0] is equal to [1100].

From the state 728, the finite state machine may return (arrow 730, OpsrMask=1) to the state 702. This transition from the state 728 to the state 702 is done when the signal OpsrMask is placed in the high state.

The finite state machine 700 is, in particular, configured in order to: make it possible to re-synchronize the elements of the domain subject to the reset signal nHReset and the elements of the other domain subject to the reset signal nPor; and ensure that the status register FLASH_OPSR contains coherent data, that is to say, either a sequence of 0 (if the value of the mask OpsrMask is equal to 1), or the address, the memory bank identifier, the memory chip identifier and the code of a valid operation to be executed (if the value of the mask OpsrMask is equal to 0).

If the status register FLASH_OSPR is not empty, in other words if it does not contain a sequence of 0, the operation may be executed. In this case, that is to say, when the operation is not masked, the finite state machine 700 then transitions from the state 702 to the state 718 by the arrow 720.

If the status register FLASH_OPSR is empty, in other words if it contains a sequence of 0, and an operation is launched, the finite state machine 700 then goes from the state 702 to the state 706 via the arrow 704. A request followed by an acknowledgement is then exchanged by means of the states 710 and 714. This request and this acknowledgement are not useful in the case where the finite state machine 700 goes directly from the state 702 to the state 718 via the arrow 720 as explained above.

According to this embodiment, only seven values ([0000], [0011], [0101], [1001], [0110], [1010] and [1100]), among the sixteen values that are theoretically possible for the word CurOpsrState[3:0], correspond to possible states of the finite state machine 700. These seven values are advantageously chosen such that each switching from one to the other of these values is done through a modification of two bits of the word CurOpsrState[3:0]. This, in particular, makes it possible to protect oneself in case of drift due, for example, to an untimely inversion of one of the bits of the word CurOpsrState[3:0]. The value assumed by the word CurOpsrState[3:0] then does not correspond to any possible state of the finite state machine 700, which makes it possible to detect the drift.

The seven values that may be assumed by the word CurOpsrState[3:0] are further configured to detect a pulse of the reset signal nHReset. In this case, the finite state machine 700 may be returned, from any state, toward the state 702. It is assumed, as an example, that the finite state machine 700 is in the state 714, the word CurOpsrState[3:0] then being equal to During the reset, the word CurOpsrState[3:0], for example, assumes the value [1000], then the value [0000] corresponding to the state 702. If a pulse of the clock signal HClk occurs while the word CurOpsrState[3:0] is equal to [1000] (due to the fact that the signals HClk and nHReset are asynchronous), this value will not be interpreted as corresponding to a possible state of the finite machine 700, but as corresponding to an idle state.

Figure 8:
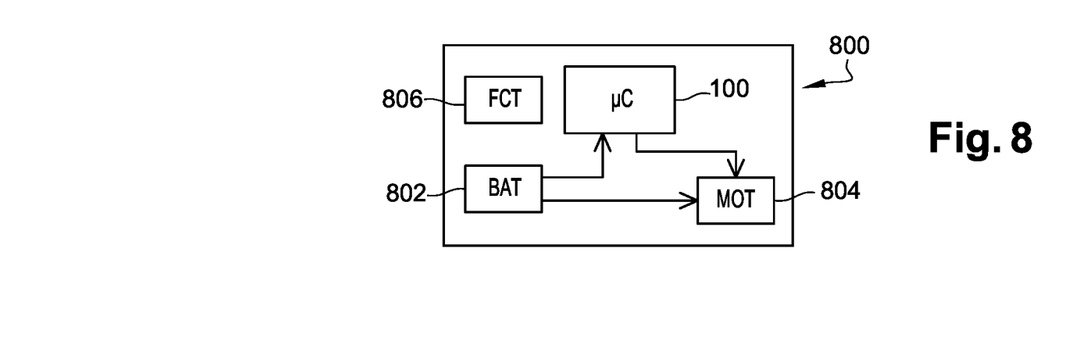
FIG. 8 shows, very schematically and in block form, an exemplary system comprising a flash memory.

FIG. 8 shows, very schematically and in block form, an exemplary system 800 comprising a flash memory. In the example of the system 800, the flash memory is, for example, part of the microcontroller 100 (μC) as previously described in relation with FIG. 1.

The system 800 is, for example, an embedded system, for example a drone. The drone 800 includes an energy source (block 802, BAT), for example a battery. The battery 802 in particular powers one or several motors, symbolized in FIG. 8 by a block 804 (MOT).

The battery 802 also powers the microcontroller 100, for example by means of an energy converter (not shown in FIG. 8). The microcontroller 100 is, in particular, used as a flight controller of the drone 800, that is to say, the microcontroller 100 is configured to command the motors 804 of the drone 800.

The drone 800 may also include various other elements. In FIG. 8, these elements are symbolized by a block 806 (FCT).

The integrity check methods disclosed above in relation with FIGS. 4 to 7, in particular, make it possible to ensure that the content of the flash memory of the microcontroller 100, in other words the content of the flash memory chips 104 and 106 (not visible in FIG. 8), are not altered following resets taking place during write or erase operations in this memory. This, for example, makes it possible to avoid introducing errors into code instructions of the firmware of the drone 800, therefore not to deteriorate the operation of the drone 800. One thus obtains a more reliable drone 800 than if the integrity check methods were not implemented.

Various embodiments have been described. Those skilled in the art will understand that certain features of these embodiments and variants can be combined and other variants will readily occur to those skilled in the art. In particular, the disclosed embodiments may be transposed to any number of memory chips each comprising any number of memory banks. The size of the status register 500 (FIG. 5) and the information that it contains may, in particular, easily be adapted to cover these various configurations. Furthermore, what is more specifically described in relation with an exemplary application to a flash memory chip more generally applies to any type of memory.

Finally, the practical implementation of the embodiments and variants described herein is within the capabilities of those skilled in the art based on the functional description provided hereinabove. In particular, the management of the states of the different signals is within the capabilities of those skilled in the art from the above description.

The invention claimed is:

1. A method for checking the integrity of a memory, comprising the following steps:
   storing data representative of an operation to be executed in the memory;
   imposing by a hardware circuit coupled to connecting pads of memory command signals corresponding to the operation;
   executing the operation;
   erasing the data once the execution of the operation is completed; and
   in response to a reset which interrupts execution of the operation before being completed:
   causing said hardware circuit to maintain imposition of said memory command signals notwithstanding that the reset has occurred and the operation was interrupted; and
   restarting the memory.

2. The method according to claim 1, further comprising a step of reading the data before executing another operation in the memory.

3. The method according to claim 1, further comprising a step of reading the data after restarting the memory.

4. The method according to claim 1, further comprising a step of detecting, after restarting and as a function of the data, whether an interruption has occurred during the execution of the operation.

5. The method according to claim 4, further comprising a step of repeating execution of the operation if an interruption is detected.

6. The method according to claim 5, further comprising a step, before the repeating execution of the operation, of completely erasing a memory page subsequently configured to be modified by execution of the operation.

7. The method according to claim 1, wherein the data include an operation code that identifies the operation to be executed in the memory.

8. The method according to claim 7, wherein the operation code has:
   a first set of values when no operation is being executed in the memory;
   a second set of values when a write operation is being executed in the memory;
   a third set of values when an erase operation is being executed in the memory; and
   a fourth set of values when a configuration operation of the microcontroller is being executed,
   wherein the first and fourth sets of values are each preferably being made up of a single value.

9. The method according to claim 8, wherein the second set of values comprises:
   a first value, if a write operation of a word is being executed in the memory; and
   a second value, if a write operation of several words, preferably eight words, is being executed in the memory.

10. The method according to claim 8, wherein the third set of values comprises:
    a third value, if an erase operation of a memory page is being executed in the memory;
    a fourth value, if an erase operation of a memory bank is being executed in the memory; and
    a fifth value, if an erase operation of several memory banks is being executed in the memory.

11. The method according to claim 1, wherein the data further include:
    an address pointing to a memory area where the operation is executed;
    an identifier of a memory bank where the operation is executed; and
    an identifier of a memory chip where the operation is executed.

12. The method according to claim 1, wherein the memory is part of a microcontroller including:
    a processor; and
    at least two memory chips, wherein each memory chip comprises at least two memory banks.

13. The method according to claim 12, wherein the data are stored in a register of one of the memory chips.

14. The method according to claim 1, wherein the memory is a flash memory.

15. A finite state machine configured to implement the method according to claim 1.

16. A system, comprising at least one memory configured to implement the method according to claim 1.

17. A method, comprising:
- in response to a command to execute an operation to write data in, or erase data in, a memory, storing data in a data register that is representative of the operation to be executed;
- wherein the data that is representative of the operation includes an operation code that identifies the operation to be performed in the memory;
- wherein the operation code has:
  - a first set of values when no operation is being executed in the memory;
  - a second set of values when a write operation is being executed in the memory;
  - a third set of values when an erase operation is being executed in the memory; and
  - a fourth set of values when a configuration operation of the microcontroller is being executed,
    - wherein the first and fourth sets of values are each preferably being made up of a single value;
- performing the operation; and
- in response to an interruption which occurs during performing of the operation which causes a reset of the memory:
  - restarting the memory;
  - reading the data that is representative of the operation to be executed from the register to confirm that the operation was not completed;
  - repeating performing of the operation; and
  - in response to completion of performing the operation, erasing the data from the data register.

18. The method according to claim 17, further comprising, before the repeating performing the operation, completely erasing a memory page subsequently configured to be modified by performing the operation.

19. The method according to claim 17, wherein the second set of values comprises:
- a first value, if a write operation of a word is being executed in the memory; and
- a second value, if a write operation of several words, preferably eight words, is being executed in the memory.

20. The method according to claim 17, wherein the third set of values comprises:
- a third value, if an erase operation of a memory page is being executed in the memory;
- a fourth value, if an erase operation of a memory bank is being executed in the memory; and
- a fifth value, if an erase operation of several memory banks is being executed in the memory.

21. The method according to claim 17, wherein the memory is a flash memory.

22. The method according to claim 17, further comprising causing a hardware circuit coupled to the memory to continue to impose command signals corresponding to the operation on connecting pads of the memory in response to said reset.

23. A finite state machine configured to implement the method according to claim 17.

* * * * *